United States Patent
Wu

(10) Patent No.: US 10,562,040 B2
(45) Date of Patent: Feb. 18, 2020

(54) CENTRIFUGAL FILTERING DEVICE AND METHOD FOR OPERATING THE SAME

(71) Applicant: SEVEN JUICE CO., LTD., New Taipei (TW)

(72) Inventor: Jung-Ming Wu, New Taipei (TW)

(73) Assignee: SEVEN JUICE CO., LTD., New Taipei (TW)

( * ) Notice: Subject to any disclaimer, the term of this patent is extended or adjusted under 35 U.S.C. 154(b) by 0 days.

(21) Appl. No.: 16/391,023

(22) Filed: Apr. 22, 2019

(65) Prior Publication Data
US 2019/0247864 A1 Aug. 15, 2019

Related U.S. Application Data

(63) Continuation-in-part of application No. 15/198,866, filed on Jun. 30, 2016, now abandoned.

(30) Foreign Application Priority Data

Jul. 3, 2015 (TW) .............................. 104121683 A
May 6, 2016 (TW) .............................. 105114163 A

(51) Int. Cl.
*B04B 3/00* (2006.01)
*B04B 11/02* (2006.01)
(Continued)

(52) U.S. Cl.
CPC ............ *B04B 3/00* (2013.01); *B01D 17/0217* (2013.01); *B01D 33/073* (2013.01); *B01D 33/11* (2013.01); *B04B 11/02* (2013.01)

(58) Field of Classification Search
CPC .. B04B 3/00; B04B 11/02; B04B 7/16; B04B 11/08; B04B 1/08; B01D 17/0217; B01D 33/11; B01D 33/073
See application file for complete search history.

(56) References Cited

U.S. PATENT DOCUMENTS 3,279,686 A 10/1966 Hubman
3,684,098 A * 8/1972 Bentley .................. B01D 33/11
210/374

(Continued)

FOREIGN PATENT DOCUMENTS

WO WO 94/06535 A1 3/1994

OTHER PUBLICATIONS

Wang, Yun-Zhang et al. "Guide to Select an Industrial Centrifugal and Filtering Machine", Chemical Industry Press, Jan. 2014, Beijing, pp. 58-59, 62-63, 128-129, 140-141 and 188-189.

*Primary Examiner* — Liam Royce
(74) *Attorney, Agent, or Firm* — Muncy, Geissler, Olds & Lowe, P.C.

(57) ABSTRACT

A centrifugal filtering device includes a centrifugal drum and a rotary filter. The centrifugal drum has a receiving space for accommodating the source fluid. The rotary filter rotatably mounted in the receiving space includes a filter body and a filtrate discharge pipe. The filter body includes a filter cartridge defining a filtrate-collecting space. The filtrate discharge pipe connecting the filter body is communicative in space with the filtrate-collecting space. By rotating at least one of the centrifugal drum and the rotary filter, the source fluid is driven to generate a vortex by a centrifugal force. The centrifugal force drives the source fluid to form a heavy-phase fluid hitting the centrifugal drum and a light-phase fluid approaching the filter cartridge. The light-phase fluid passes the filter cartridge and then reaches the filtrate-collecting space as a filtrate, and the filtrate is exhausted via the filtrate discharge pipe of the centrifugal filtering device.

13 Claims, 9 Drawing Sheets

(51) Int. Cl.
*B01D 17/02* (2006.01)
*B01D 33/11* (2006.01)
*B01D 33/073* (2006.01)
*B04B 7/16* (2006.01)
*B04B 11/08* (2006.01)
*B04B 1/08* (2006.01)

(56) References Cited

U.S. PATENT DOCUMENTS

| | | | |
|---|---|---|---|
| 3,828,524 A | | 8/1974 | Booth et al. |
| 4,339,072 A | | 7/1982 | Hiller |
| 4,790,942 A | * | 12/1988 | Shmidt .................... B01D 9/00 210/321.63 |
| 5,143,630 A | * | 9/1992 | Rolchigo ............. B01D 29/055 210/780 |
| 5,401,422 A | * | 3/1995 | Mignot ................ B01D 33/067 209/1 |
| 6,461,513 B1 | * | 10/2002 | Jen ......................... B01D 63/06 210/323.2 |

* cited by examiner

CENTRIFUGAL FILTERING DEVICE AND METHOD FOR OPERATING THE SAME

CROSS REFERENCE TO RELATED APPLICATIONS

This application is a Continuation-in-Part of co-pending application Ser. No. 15/198,866, filed on Jun. 30, 2016, for which priority is claimed under 35 U.S.C. § 120; and this application claims the benefit of Taiwan Patent Application Serial No. 105114163, filed May 6, 2016, and the Serial No. 104121683, filed Jul. 3, 2015, the entire contents of all of which is incorporated herein by reference.

BACKGROUND OF INVENTION

1. Field of the Invention

The invention relates to a centrifugal filtering device, and more particularly to the centrifugal filtering device that rotates a centrifugal drum or a rotary filter to generate a centrifugal force so as to separate a source fluid into a light-phase fluid and a heavy-phase fluid.

2. Description of the Prior Art

Centrifugal methods and filtration technologies are widely applied in various industries such as petrochemicals, metallurgy, chemical engineering, biology, foods, energies, mechanical engineering, power, coals, alcohols, textiles, pharmaceutics, health and the like. Conventional centrifugal apparatuses are used to separate fluids (including a liquid phase, a gas phase and a solid phase in a powder form) into solid-liquid phases, liquid-liquid phases, liquid-liquid-solid phases, and solid-liquid-liquid phases. The applications include dewatering, precipitation, classification, concentration, separation and so on.

Generally speaking, centrifugal filtration is to put a suspension solution under centrifugal force and to have the solution to pass a filter so as to leave the solid particles in the solution on the filter. The fouling particles would be gradually accumulated into a filter cake. The solution passing the filter cake and the filter would form a product named as a filtrate. Currently, the centrifugal/filtering machines in the marketplace can be classified into a tripod type, a tablet type, an on-suspension type, a by-filtration type, a scraper type, a piston type, a screw-propelling type, a centrifugal-forcing type, a shaking type, a pushing type, an over-turning type and any the like. Details for the aforesaid centrifugal and/or filtering machines can be reached in a book titled in Chinese as "工業離心機和過濾機選用手冊 (Guide to select an industrial centrifugal and filtering machine)" (ISBN 978-7-122-18787-1).

Nevertheless, to a strict standard upon granular sizes of the particles, to obtain particles with finer sizes generally implies that a larger scale of centrifugal force and a finer filter are needed. However, a tiny particle would be easier to block the filter so as to form a fouling problem to obstacle the following centrifugal filtering operation. Thus, frequency stops to clean and/or replace the filter/membrane-filter are necessary. Consequently, work time and production cost are increased remarkably. Hence, an improved centrifugal filtering apparatus applicable to separating particles and/or suspension solutions, able to slow down the fouling at the filter, and easy to operate is definitely needed.

Referring now to FIG. 1, a conventional centrifugal machine is schematically shown. The centrifugal machine PA100 includes a machine body PA1, a shaft PA2 and a screen assembly PA3. The shaft PA2 is rotatably disposed in the machine body PAL The screen assembly PA3 as the filter sleeves fixedly the shaft PA2 and thus rotates with the shaft PA2. When the shaft PA2 rotates, a source fluid PA300 inside the screen assembly PA3, introduced from a material inlet PA21 of the shaft PA2, would be moved and rotated so as to induce a centrifugal force to pass the screen assembly PA3. Thereby, particles in the source fluid PA300 would be retained on the screen assembly PA3 and gradually piled into a solid filter cake PA200.

As described, since the rotation of the shaft PA2 would drive the source fluid PA300 to flow in a rotational manner, and thus the particles in the source fluid PA300 would be naturally driven to displace in the flow direction of the source fluid PA300, and finally be fouled by and accumulated on the screen assembly PA3. Hence, inevitably, the filtration rate or yield of the centrifugal machine PA100 would be substantially reduced due to the increase of the thickness of the solid filter cake PA200. After a period time of usage, the centrifugal machine PA100 shall stop to clean off the solid filter cake PA200, such that a normal filtration rate of the centrifugal filtering device PA100 can be maintained.

SUMMARY OF THE INVENTION

In viewing of the prior art, the conventional centrifugal machine has the particles and the filtrate to move in the same direction, so that the particles would be accumulated on the filter. As a result, the filtration rate is reduced, or frequent replacement or cleaning of the filter is necessary. Accordingly, it is a primary object of the present invention to provide a centrifugal filtering device that utilizes the balancing of the centrifugal force and the mass, in which the centrifugal force drives the particles to move in one direction, while the continuing inlet fluid is driven to move in an opposite direction toward the filter. Thus, the filtration rate can be maintained at a stable and high level, and no more frequent replacing or cleaning the filter is necessary.

In the present invention, the centrifugal filtering device, applied to filter a source fluid including a plurality of particles, includes a centrifugal drum and a rotary filter. The centrifugal drum has a receiving space for accommodating the source fluid. The rotary filter is rotatably mounted in the receiving space, and further includes a filter body and a filtrate discharge pipe. The filter body includes a filter cartridge for forming a filtrate-collecting space. The filtrate discharge pipe is connected with the filter body and communicative in space with the filtrate-collecting space. In the present invention, by rotating at least one of the centrifugal drum and the rotary filter, the source fluid is driven to generate a vortex by a centrifugal force. Further, in a circumstance of providing a non-decreasing (i.e. increasing or stable) feeding amount of the source fluid, the centrifugal force drives the source fluid to form a heavy-phase fluid hitting the centrifugal drum and a light-phase fluid approaching the filter cartridge. In particular, a weight distribution of the particles of the source fluid is in a decreasing manner from the heavy-phase fluid to the light-phase fluid. Then, the light-phase fluid passes the filter cartridge and then reaches the filtrate-collecting space as a filtrate, and the filtrate is exhausted via the filtrate discharge pipe of the centrifugal filtering device.

In one embodiment of the present invention, the filter body further includes a base cover and a top cover, the base cover and the top cover being fixedly located respectively at a bottom and a top of the filter cartridge so as thereby to enclose the filtrate-collecting space, the filtrate discharge pipe being connected to the base cover.

In one embodiment of the present invention, the rotary filter further includes a source fluid-feeding pipe connected with the filter body and rotationally penetrating the centrifugal drum, the source fluid-feeding pipe having at least one material-feeding opening communicative in space with the receiving space so as to allow the source fluid to enter the receiving space via the source fluid-feeding pipe.

In one embodiment of the present invention, the filtrate discharge pipe rotationally penetrates the centrifugal drum.

In one embodiment of the present invention, the centrifugal drum includes a lower casing, a drum body and an upper casing, the lower casing having at least one fluid outlet communicative in space with the receiving space, the heavy-phase fluid being exhausted out of the receiving space via the fluid outlet, the lower casing and the upper casing being respectively connected to opposing ends of the drum body so as to define thereinside the receiving space.

In one embodiment of the present invention, the centrifugal filtering device further includes a fluid-collecting tank, the centrifugal drum being rotatably disposed in the fluid-collecting tank and further having at least one fluid outlet communicative in space with the receiving space, the fluid-collecting tank being to collect the heavy-phase fluid exhausted from the fluid outlet. Further, the fluid-collecting tank includes an upper fluid-collecting tank, the upper casing includes at least one overflow outlet communicative in space with the receiving space, and the upper fluid-collecting tank is located at a top of the fluid-collecting tank.

In one embodiment of the present invention, the centrifugal drum includes a filtering drum body for filtering the heavy-phase fluid.

In one embodiment of the present invention, the rotary filter further includes a spiral blade located at the filter cartridge.

In one embodiment of the present invention, the filter body further includes a plurality of discs connected with the filter cartridge.

A method for the centrifugal filtering device of claim 1 comprises the steps of: constructing a delivery piping so as to connect a source fluid-storage container having the source fluid to the receiving space of the centrifugal drum; applying a pump to convey the source fluid stored in the source fluid-storage container to fill the receiving space; and, rotating at least one of the centrifugal drum and the rotary filter, the source fluid is driven to generate a vortex by a centrifugal force, further, in a circumstance of providing a non-decreasing feeding amount of the source fluid, the centrifugal force driving the source fluid to form a heavy-phase fluid hitting the centrifugal drum and a light-phase fluid approaching the filter cartridge where a weight distribution of the particles of the source fluid is in a decreasing manner from the heavy-phase fluid to the light-phase fluid, and then the light-phase fluid passing the filter cartridge and reaching the filtrate-collecting space as a filtrate while the filtrate is exhausted via the filtrate discharge pipe of the centrifugal filtering device.

As stated above, in the conventional centrifugal machine that applies simply the centrifugal force to purify the source fluid, since the moving directions of the particles and the fluid are the same, so that the particles would be accumulated on the centrifugal filter. As an inevitable result, the filtration rate of the conventional centrifugal machine would be substantially reduced to for a requirement in machine shutdown for cleaning or replacing the filter. However, since the filtering device of the present invention is installed inside the centrifugal drum and is rotatable, so the rotation of the centrifugal drum would generate corresponding centrifugal force to drive the heavy-phase fluid including the particles to hit the inner wall of the centrifugal drum and, on the other hand, drive the light-phase fluid including fewer particles to move in a reverse direction to approach the filter cartridge by having the feeding amount slightly larger than or equal to the filtering outlet. The filter cartridge is applied to filter the light-phase fluid so as to produce a filtrate in the filtrate-collecting space, and the filtrate is exhausted out of the centrifugal filtering device via the filtrate discharge pipe. Thus, by compared with the conventional centrifugal machine, the centrifugal filtering device of the present invention demonstrates superior features over the dead-end filtration (i.e. the filter-cake filtration) and the cross-flow filtration, since the centrifugal filtering device of the present invention is to provide opposing flow directions to the particles and the filtrate so that a higher filtration rate and a slowdown in scaling the filter can be obtained.

All these objects are achieved by the centrifugal filtering device described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a centrifugal filtering device. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
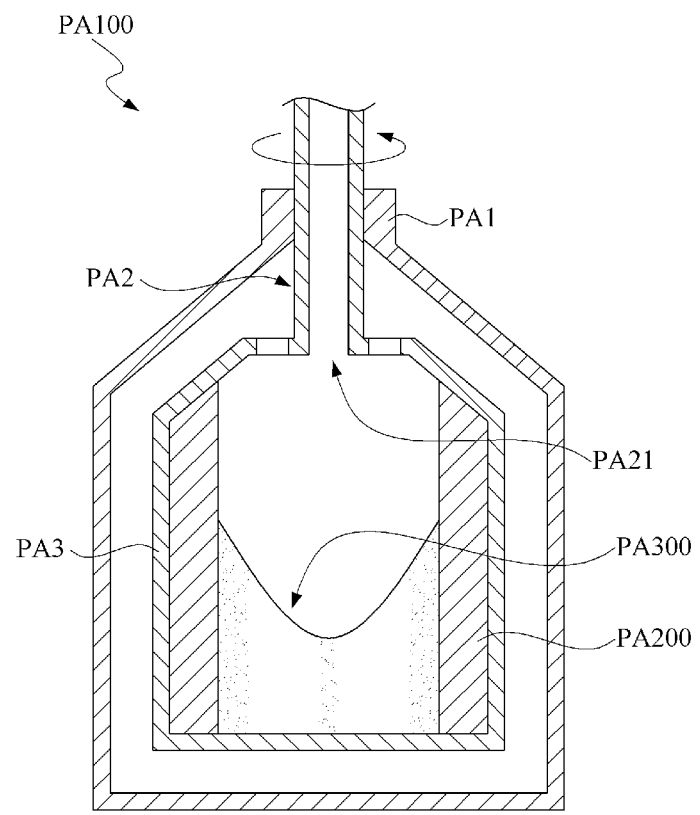
FIG. 1 is a schematic view of a conventional centrifuge.
Figure 2:
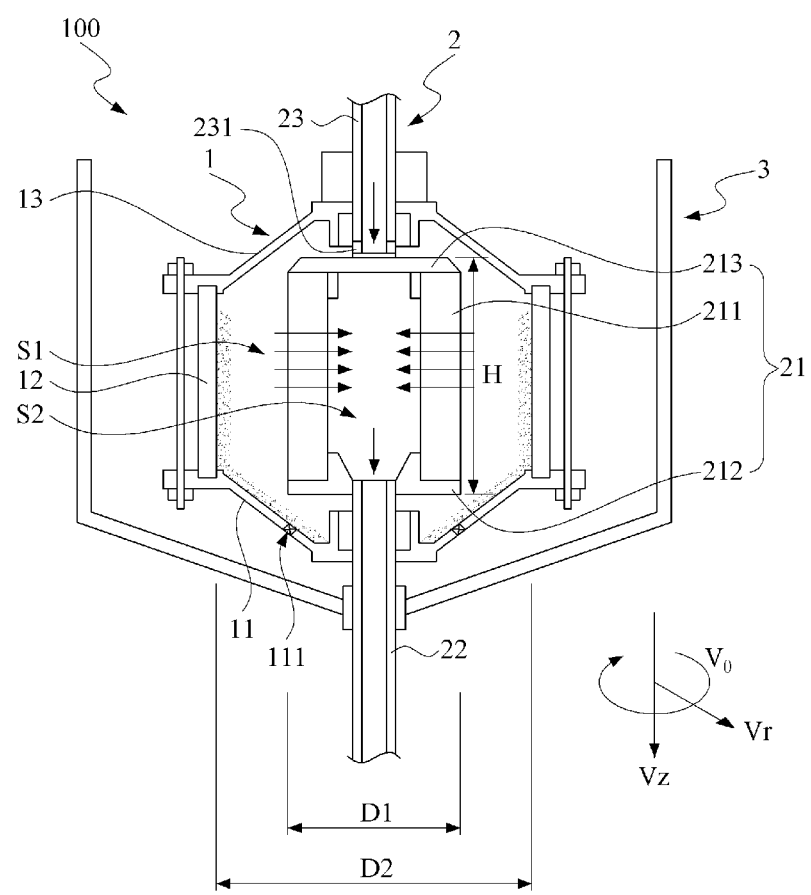
FIG. 2 is a schematic view of a first embodiment of the centrifugal filtering device in accordance with the present invention.

Referring now to FIG. 2, a schematic view of a first embodiment of the centrifugal filtering device in accordance with the present invention is shown. The centrifugal filtering device 100 is applied to filter a source fluid, where the source fluid can include plural types of particles (not labeled in the figure). The centrifugal filtering device 100 includes a centrifugal drum 1, a rotary filter 2 and a fluid-collecting tank 3. The centrifugal drum 1 further includes a lower casing 11, a drum body 12 and a upper casing 13. The lower casing 11 is structured to have a plurality of fluid outlets 111 (one labeled in the figure). The drum body 12 is disposed between the lower casing 11 and the upper casing 13 so as thereby to form internally a receiving space S1. The receiving space S1, defined usually as a tank for a centrifugal machine, can be shaped into, but not limited to, a cylindrical tank, a rectangular tank, a cubic tank or a tank with a shape relevant to a conventional centrifugal machine or a hydrocyclone. In practical applications, materials for the lower casing 11, the drum body 12 and the upper casing 13 can be, but not limited to, an acrylic or the like material with equivalent weight and hardness. The drum body 12 can be fixed to the lower casing 11 and the upper casing 13 via, but not limited to, a screwing means. The fluid outlet 111 further has a valve to control the flow rate.

The rotary filter 2 ratably mounted inside the receiving space S1 further includes a filter body 21, a filtrate discharge pipe 22 and a source fluid-feeding pipe 23. The filter body 21 includes a filter cartridge 211, a base cover 212 and a top cover 213. In practical applications, the filter cartridge 211 can be formed as, but not limited to, a cylindrical filter, a fordable filter, or generally a filter. The base cover 212 is fixed to a bottom of the filter cartridge 211, while the top cover 213 is fixed to a top of the filter cartridge 211. Upon such an arrangement, the filter cartridge 211 can be held firmly at both ends thereof by the base cover 212 and the top cover 213. Also, by providing the filter cartridge 211, the base cover 212 and the top cover 213, an enclosed filtrate-collecting space S2 is formed in between thereinside.

The filtrate discharge pipe 22 rotationally penetrates the lower casing 11 of the centrifugal drum 1 so as able to connect with the base cover 212 of the filter body 21. The filtrate discharge pipe 22 is further communicative in space with the filtrate-collecting space S2. In particular, a bearing is introduced to the lower casing 11 to rotationally mount the filtrate discharge pipe 22 in a penetration manner, so as to allow the filtrate discharge pipe 22 to be rotatable with respect to the lower casing 11.

On the other hand, the source fluid-feeding pipe 23 rotationally penetrates the upper casing 13 of the centrifugal drum 1 so as able to connect the top cover 213 of the filter body 21. The source fluid-feeding pipe 23 has a plurality of material-feeding openings 231 (one labeled in the figure), and each of the material-feeding openings 231 is communicative in pace with the receiving space S1, so as to allow the source fluid to enter the receiving space S1 through the source fluid-feeding pipe 23. In particular, a bearing is introduced to the upper casing 13 to rotationally mount the source fluid-feeding pipe 23 in a penetration manner, so as to allow the source fluid-feeding pipe 23 to be rotatable with respect to the upper casing 13.

The fluid-collecting tank 3 is to sleeve the centrifugal drum 1 in a manner that the centrifugal drum 1 can be rotatably disposed inside the fluid-collecting tank 3.

As described above, in practical applications, when the external source fluids are continuously fed into the receiving space S1 via the material-feeding openings 231 of the source fluid-feeding pipe 23 under a control of the feeding amount being larger slightly than the liquid amount filtered by the filter cartridge 211, then a vortex of the source fluids in the receiving space S1 would be generated due to the rotation of the centrifugal drum 1 or the rotary filter 2. At this time, the centrifugal force generated with the vortex would separate largely the source fluids into a heavy-phase fluid hitting the centrifugal drum 1 and a light-phase fluid approaching the filter cartridge 211. In the present invention, the heavy-phase fluid is the fluid containing particles that is more affected by the centrifugal force, while the light-phase fluid is the fluid that is less affected by the centrifugal force. The heavy-phase fluid that hits the drum body 12 would sink gradually and finally be exhausted out of the drum body 12 in a liquid form to the fluid-collecting tank 3 via the fluid outlet 111 of the lower casing 11. Generally, the fluids inside the fluid-collecting tank 3 are cloudy fluids containing plenty of heavy particles. The control of the fluid outlet 111 can be set to be opened after a comprehensive period of time. In addition, when the flow amount of the source fluid entering the receiving space S1 is not smaller than that of the filtrate exhausted from the filtrate discharge pipe 22, the light-phase fluid would approach the filter cartridge 211 so as to force the light-phase fluid to pass the filter cartridge 211 and further to generate a clear filtrate in the filtrate-collecting space S2. The filtrate is then exhausted off through the filtrate discharge pipe 22. Of course, it can be preset that the flow amount of the source fluid entering the receiving space S1 is not smaller than a sum of the flow amount exhausted from the fluid outlet 111 and the liquid amount filtered by the filter cartridge 211. At this time, the light-phase fluid would approach the filter cartridge 211 so as to force the light-phase fluid to pass the filter cartridge 211 and to generate a clear filtrate in the filtrate-collecting space S2. The filtrate can be further exhausted through the filtrate discharge pipe 22.

In addition, regarding the aforesaid rotations in the centrifugal drum 1 or the rotary filter 2, since the rotary filter 2 connects individually the filtrate discharge pipe 22 and the source fluid-feeding pipe 23, thus a driving motor can be introduced to rotate the rotary filter 2 via the filtrate discharge pipe 22 and the source fluid-feeding pipe 23. Alternatively, the driving motor can be directly coupled with and thus rotate the centrifugal drum 1. In the present invention, the rotational directions of the centrifugal drum 1 and the rotary filter 2 can be preset to be the same or reverse, so as to increase the rotation speed of the vortex of the source fluid inside the receiving space S1 and thus to enhance the filtration efficiency. It is noted that the rotation of the rotary filter 2 would drive the filter cartridge 211 to rotate accordingly. The shear forcing caused by the rotation would prohibit particles not to contaminate the surface of the filter cartridge 211, such that the surface scaling at the filter cartridge 211 would be slowed down and thus the filtration rate would be increased.

In an embodiment of the present invention, the rotary filter 2 can be held without rotation because the main feature of the present invention is to drives the source fluid to form the heavy-phase fluid hitting the centrifugal drum 1 and the light-phase fluid approaching the filter cartridge 211; i.e. the heavy-phase fluid and the light-phase fluid have different move directions. To generate enough centrifugal force for forming the heavy-phase fluid and the light-phase fluid, the centrifugal drum may have a rotational speed of 300 rpm, and 500 rpm is preferred. In addition, to make sure that the heavy-phase fluid can be driven toward the inner wall of the centrifugal drum 1 by the centrifugal force and the light-phase fluid moves toward the filter cartridge 211 for mass balance, the centrifugal drum 1 is substantially a closed chamber and thus the centrifugal filtering device does not need a large feeding force, as a preferred embodiment, a feeding force of 1.2 atm is enough.

In order to guarantee a sufficient flow path for forming the heavy-phase fluid and the light-phase fluid with different flow directions, the centrifugal drum 1 of the present invention should have a wide receiving space therein. For example, the shape of the centrifugal filtering device should follow the equation (D2−D1)/H>1.0, wherein D1 is the outer diameter of the filter cartridge 211, D2 is the inner diameter of the centrifugal drum 1, and H is the height of the filter cartridge 211, and the equation (D2−D1)/H>2.0 is preferred.

As a preferred embodiment of the present invention, the flowing mechanism in the receiving space of the centrifugal drum 1 does not have the Taylor vortex flow. The radial speed Vr is greater than the axial speed Vz, and the centrifugal speed Vθ is greater than the radial speed Vr.

Figure 3:
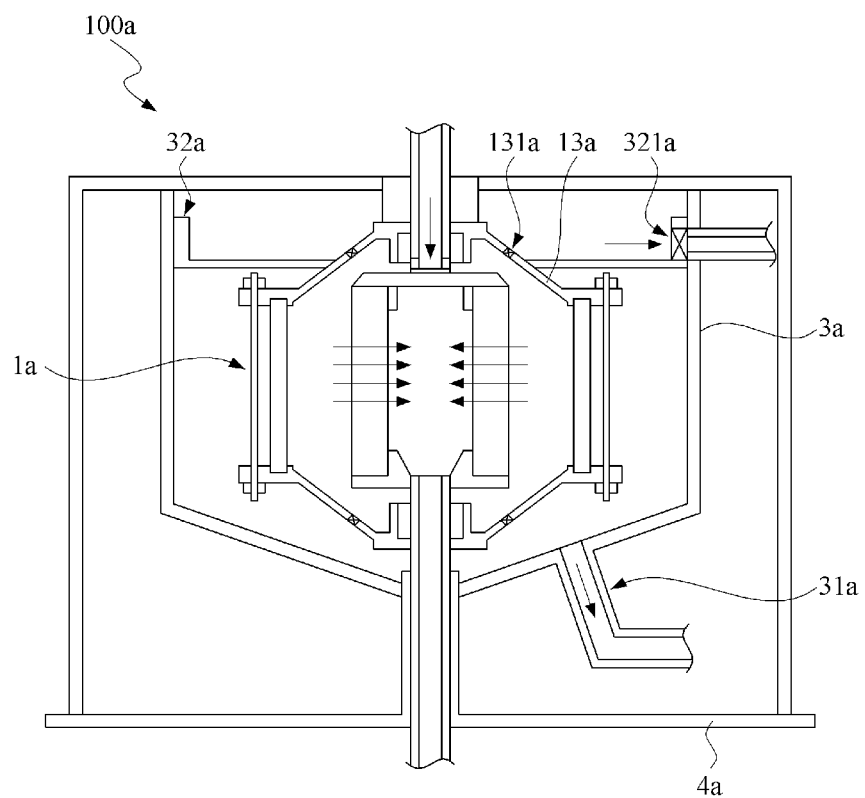
FIG. 3 is a schematic view of a second embodiment of the centrifugal filtering device in accordance with the present invention.

Referring now to FIG. 3, a schematic view of a second embodiment of the centrifugal filtering device in accordance with the present invention is shown. The centrifugal filtering device 100a in this second embodiment is largely resembled to the centrifugal filtering device 100 in the aforesaid first embodiment. The major difference in between is that, in this second embodiment, the centrifugal filtering device 100a further includes a supportive frame 4a for supporting a fluid-collecting tank 3a resembled to the aforesaid fluid-collecting tank3. The fluid-collecting tank 3a further includes a fluid discharge pipe 31a and an upper fluid-collecting tank 32a. When the fluid-collecting tank 3a collects a liquid centrifugally separated from the centrifugal drum 1a, the liquid is led out from the fluid discharge pipe 31a. In addition, the upper fluid-collecting tank 32a is disposed at the upper casing 13a, and the upper casing 13a is constructed with a plurality of overflow outlets 131a communicative in space with the receiving space (not labeled in the figure). The upper fluid-collecting tank 32a is to collect the sub-light fluid overflowed from the overflow outlets 131a. Also, the upper fluid-collecting tank 32a further includes a discharge valve 321a for controlling the exhausted amount of the sub-light fluid.

Figure 4:
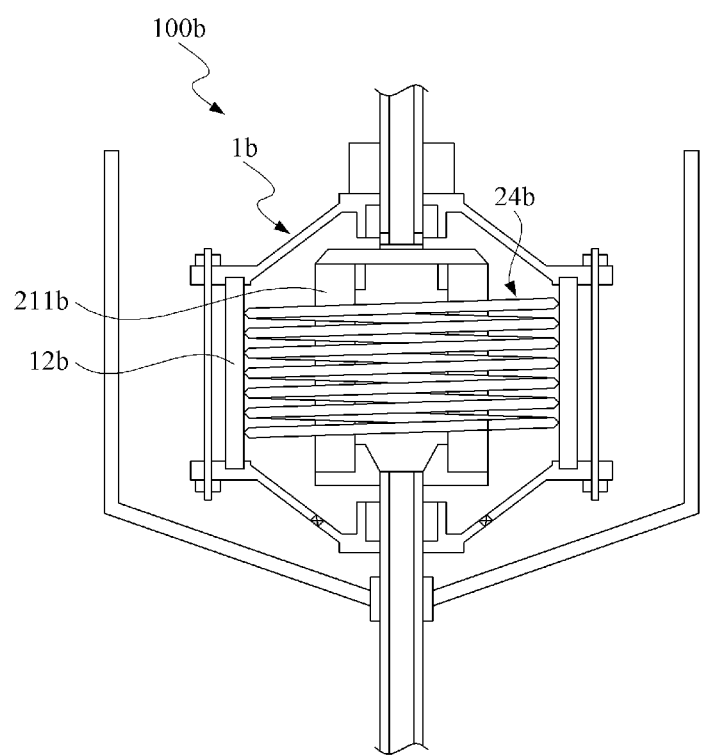
FIG. 4 is a schematic view of a third embodiment of the centrifugal filtering device in accordance with the present invention.

Referring now to FIG. 4, a schematic view of a third embodiment of the centrifugal filtering device in accordance with the present invention is shown. The centrifugal filtering device 100b in this third embodiment is largely resembled to the centrifugal filtering device 100 in the aforesaid first embodiment. The major difference in between is that, in this third embodiment, the centrifugal drum 1b further includes a spiral blade 24b located exteriorly to the filter cartridge 211b, such that, when the filter cartridge 211b rotates, the spiral blade 24b can rotate as well so as to scrape off the particles accumulated on the inner wall of the drum body 12b.

Figure 5:
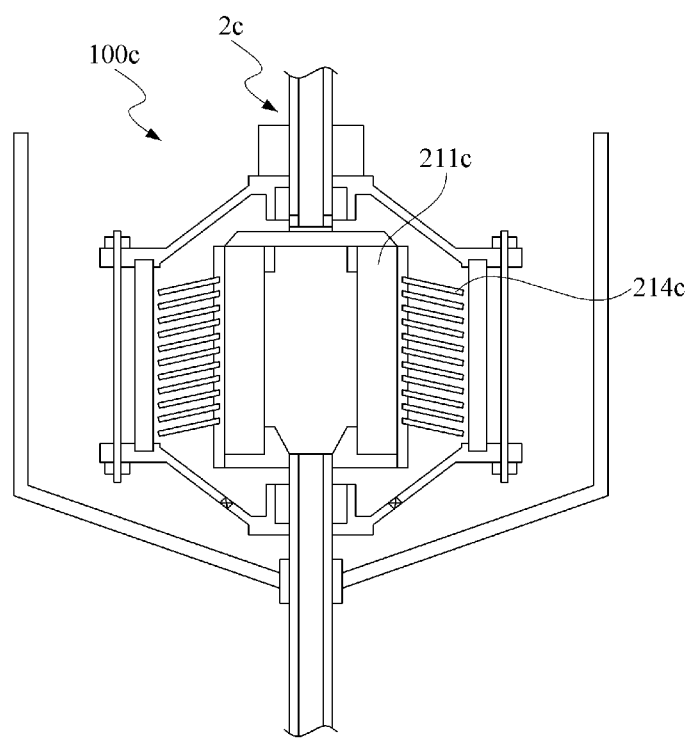
FIG. 5 is a schematic view of a fourth embodiment of the centrifugal filtering device in accordance with the present invention.

Referring now to FIG. 5, a schematic view of a fourth embodiment of the centrifugal filtering device in accordance with the present invention is shown. The centrifugal filtering device 100c in this fourth embodiment is largely resembled to the centrifugal filtering device 100 in the aforesaid first embodiment. The major difference in between is that, in this fourth embodiment, the filter body (not labeled in the figure) of the rotary filter 2c, by compared with the aforesaid filter body 21, further includes a plurality of discs 214c, each of which is extended individually out from the filter cartridge 211c as a unique piece. Namely, the disc 214c and the filter cartridge 211c are made of the same filter, such that, when the filter body rotates, the disc 214c would rotate synchronously so as to receive and to enhance the filtration rate of the source fluid.

Figure 6:
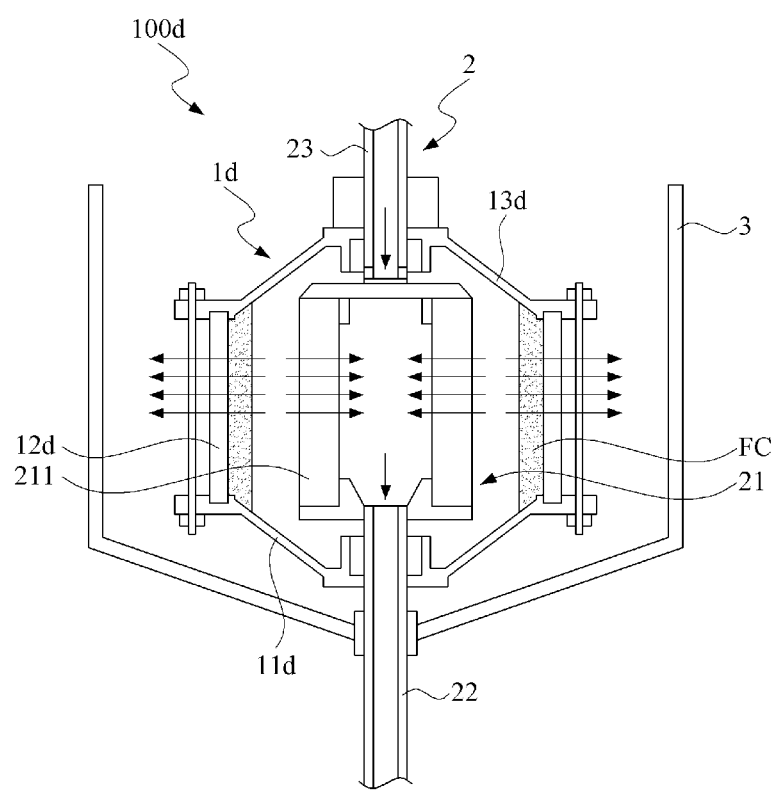
FIG. 6 is a schematic view of a fifth embodiment of the centrifugal filtering device in accordance with the present invention.

Referring now to FIG. 6, a schematic view of a fifth embodiment of the centrifugal filtering device in accordance with the present invention is shown. The centrifugal filtering device 100d in this fifth embodiment includes a centrifugal drum 1d, a rotary filter 2 and a fluid-collecting tank 3. The centrifugal filtering device 100d of this embodiment is largely resembled to the centrifugal filtering device 100 in the aforesaid first embodiment. The major difference in between is that, in this fifth embodiment, the centrifugal filtering device 100d applies the centrifugal drum 1d to replace the aforesaid centrifugal drum 1 of FIG. 2. This centrifugal drum 1d includes a lower casing 11d, a drum body 12d and an upper casing 13d, where the drum body 12d is fixedly located between the lower casing 11d and the upper casing 13d. In this fifth embodiment, the drum body 12d is set to have filtration functions. In practice, the drum body 12d can contain the filter, or be made of the filter.

As described above, after the source fluid enters the receiving space (not labeled in the figure) enclosed by the lower casing 11d, the drum body 12d and the upper casing 13d via the source fluid-feeding pipe 23, and when the centrifugal drum 1d or the rotary filter 2 rotates, the source fluid is driven to rotate as well so as to generate centrifugal force to separate the source fluid into a heavy-phase fluid to hit on the drum body 12d and a light-phase fluid to approach the filter cartridge 211. At this time, except for the filtrate filtered out while the light-phase fluid passes the filter cartridge 211, the heavy-phase fluid hitting the drum body 12d that now serves filtration functions would also generate filtrate to the fluid-collecting tank 3. The particles contained in the heavy-phase fluid would be accumulated on the inner wall of the drum body 12d and gradually form a filter cake FC. Upon such an arrangement, the centrifugal filtering device 100d of this embodiment is capable of performing the filtrations at both the filter cartridge 211 and the drum body 12d. The filter cartridge 211 of the rotary filter 2 can steadily produce the filtrate, and the drum body 12d can increase the yield of the filtrate and collect the filter cake FC. In particular, the filter cake would contain a higher percentage of solid particles if more time in filtration is experienced.

Figure 7:
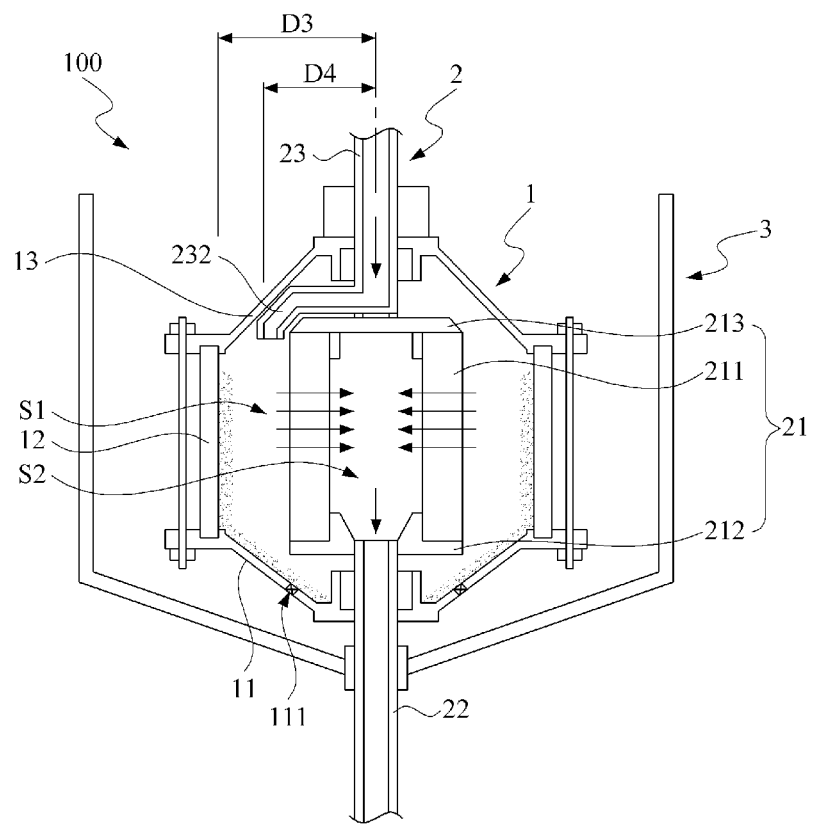
FIG. 7 is a schematic view of a sixth embodiment of the centrifugal filtering device in accordance with the present invention.

Please refer to FIG. 7, a schematic view of a sixth embodiment of the centrifugal filtering device in accordance with the present invention is shown. As shown, The source fluid-feeding pipe 23 has a material-feeding opening 232 laterally extends toward the sidewall of the centrifugal drum 1 to make sure that the heavy-phase fluid may hit the centrifugal drum 1 to force the light-phase fluid moving toward the filter cartridge 211 for mass balance. As a preferred embodiment, the location of the material-feeding opening 232 is defined by the equation D4/D3>0.4, where D4 is the distance from the rotating axis to the material-feeding opening 232, and D3 is the radius of the centrifugal drum 1, and the equation D4/D3>0.5 is preferred.

Figure 8:
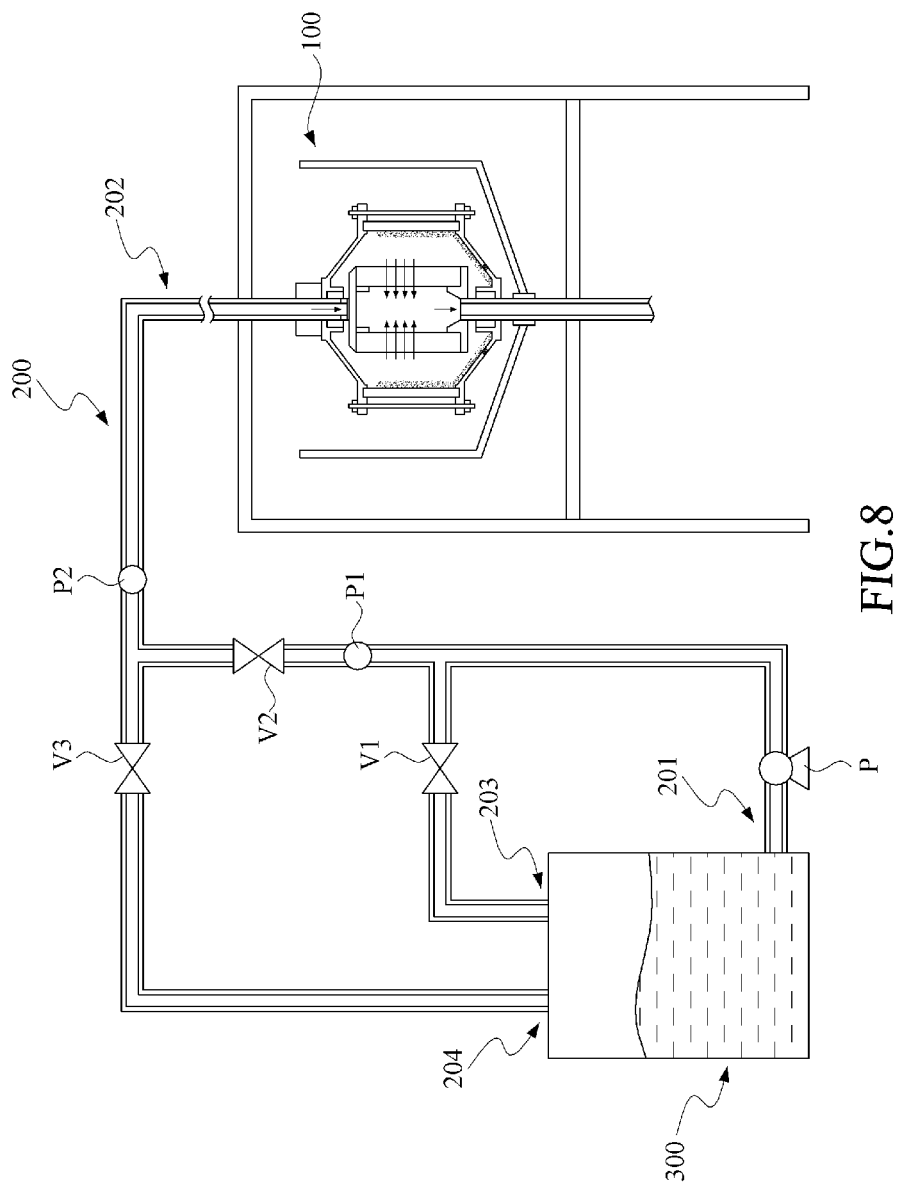
FIG. 8 shows schematically a practical application of the centrifugal filtering device of FIG. 2.

Refer to FIG. 2 and FIG. 8, where FIG. 8 shows schematically a practical application of the centrifugal filtering device of FIG. 2. as shown, the operation method of the centrifugal filtering device 100 in accordance with the present invention is firstly to construct a delivery piping 200 so as to connect the source fluid-storage container 300 having the source fluid to the receiving space S1 of the centrifugal drum 1. The delivery piping 200 as an integrated pipeline has an inlet port 201, an outlet port 202, a first backflow port 203 and a second backflow port 204. The inlet port 201 is connected to a bottom of the source fluid-storage container 300. The outlet port 202 is connected to the source fluid-feeding pipe 23 of the centrifugal filtering device 100. The first backflow port 203 and the second backflow port 204 are individually connected to a top of the source fluid-storage container 300.

A pump P of the delivery piping 200 located between the inlet port 201 and the outlet port 202 by being closer to the inlet port 201 is applied to convey the source fluid originally stored in the source fluid-storage container 300 to fill the receiving space S1. A first backflow valve V1 of the delivery piping 200 is located between the inlet port 201 and the first backflow port 203. A flow control valve V2 of the delivery piping 200 is located between the inlet port 201 and the outlet port 202. A second backflow valve V3 of the delivery piping 200 is located between the inlet port 201 and the second backflow port 204. Further, two pressure gauge and/or manometers P1 and P2 of the delivery piping 200 are located to two opposing ends of the flow control valve V2.

The receiving space S1 is filled with the source fluid. Then, at least one of the centrifugal drum 1 and the rotary filter 2 is rotated so as to drive the source fluid in the receiving space S1 to rotate into a vortex and further to form a heavy-phase fluid and a light-phase fluid. In particular, a weight distribution of the particles of the source fluid is in a decreasing manner from the heavy-phase fluid to the light-phase fluid. The light-phase fluid passes the filter cartridge 211 to generate a corresponding filtrate. In the meantime, the user can record the filtering flow rate of the filtrate, and control the flow amount of the source fluid entering the receiving space S1 to be larger than or equal to the sum of the filtered flow amount of the filtrate and the exhausting amount of the fluid, during the continuous operation of the opened fluid outlet 111 (namely, in a circumstance of providing a non-decreasing feeding amount of the source fluid). While the fluid outlet 111 is closed at a batch operation, the flow amount of the source fluid entering the receiving space S1 is controlled to be larger than the filtered flow amount of the filtrate.

As described above, while at the very beginning of the operation, the first backflow valve V1, the flow control valve V2 and the second backflow valve V3 are all opened. While at least one of the centrifugal drum 1 and the rotary filter 2 rotates, the user can further adjust the flow rate of the first backflow valve V1 and observe the pressure scale of the manometer P1 so as to ensure the pressure of the source fluid entering the receiving space S1 can reach a preset pressure value. This pressure value is mainly related to the filtration rate of the centrifugal filtering device 100. Within a controllable range of the pressure, the filtration rate of the centrifugal filtering device 100 can be increased as the pressure is increased. In addition, after the receiving space S1 is filled with the source fluid, the user can further open the second backflow valve V3 so as to control the exhausting of the gas left in the receiving space S1.

Figure 9:
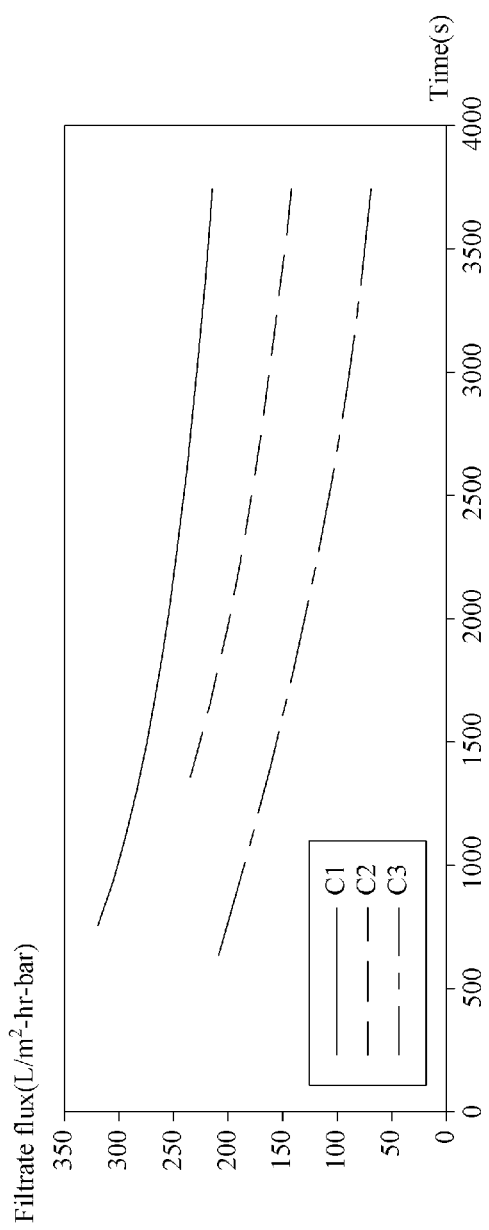
FIG. 9 demonstrates experimental results of the conventional filtration and the centrifugal filtering device of FIG. 2, in which a relationship of the testing time and the filtrate flux is shown.

Referring now to FIG. 9, results of the conventional filtration and the centrifugal filtering device of FIG. 2 are demonstrated, in which a relationship of the testing time and the filtrate flux is shown. As shown, in the comparison between the conventional filtration and the centrifugal filtering device of the present invention (for example, the aforesaid first embodiment of the centrifugal filtering device 100), experiments are carried out under the same given conditions of the same filter and the source fluid (containing 0.3 wt % 37-44 micron silicon carbide particles) for about an hour. The results are plotted in FIG. 9. As shown, the curve C3 stands for the distribution of the filtrate flux by the conventional filtration, and the curve C2 stands for the distribution of the filtrate flux by the centrifugal filtering device of the present invention. In addition, the curve C1 stands for the distribution of the filtrate flux by filtering of pure water.

As described above, while performing the pure water filtration for an hour, the resulted curve C1 shows that the corresponding filtrate flux would be about 200 LPH (L/m2-hr-bar), the maximum flux for using the filter in filtering the pure water. In the operation of the conventional filtration upon the source fluid for an hour, the curve C3 shows that the filtrate flux is reduced by about 75 LPH, and the reason for which could be the accumulation of particles on the filter. For comparison, in the operation of the centrifugal filtering device 100 of the present invention upon the source fluid for an hour, the curve C2 shows that the filtrate flux is about 150 LPH. Obviously, under the same operation conditions and by given the same filter, the filtration rate of the centrifugal filtering device of the present invention is about twice of that of the conventional one. In addition, as the operation hour is extended, the conventional filtration may meet a situation to shut down for removing the filter cake. However, the centrifugal filtering device of the present invention can reduce the influence of the fouling cake to a minimum, so that an operation shutdown for cleaning the filter cake is not necessary.

As shown in FIG. 9, compared to the filtrate flux by the conventional filtration, the steady filtrate flux by the centrifugal filtering device of the present invention can be enhanced to about 60% the filtrate flux by filtering of pure water. The steady filtrate flux indicates the filtrate flux after one-hour operation.

In addition, the feature of the present invention is to form the heavy-phase fluid and the light-phase fluid moving toward different directions to enhance filtrate flux. This feature is irrelevant to the material of the filter cartridge 211, and thus the centrifugal device provided in the present invention can be easily applied to different filter materials and source fluid, including the conventional ones, to enhance filtrate flux. For example, the centrifugal filtering device provided in the present invention can be used in the pretreatment process of chemical mechanical polishing (CMP) slurry.

In summary, in the conventional centrifugal machine that applies simply the centrifugal force to purify the source fluid, since the moving directions of the particles and the fluid are the same, so that the particles would be accumulated on the centrifugal filter. As an inevitable result, the filtration rate of the conventional centrifugal machine would be substantially reduced to for a requirement in machine shutdown for cleaning or replacing the filter. However, since the filtering device of the present invention is installed inside the centrifugal drum and is rotatable, so the rotation of the centrifugal drum would generate corresponding centrifugal force to drive the heavy-phase fluid including the particles to hit the inner wall of the centrifugal drum and, on the other hand, drive the light-phase fluid including fewer particles to move in a reverse direction to approach the filter cartridge by having the feeding amount slightly larger than or equal to the filtering amount. The filter cartridge is applied to filter the light-phase fluid so as to produce a filtrate in the filtrate-collecting space, and the filtrate is exhausted out of the centrifugal filtering device via the filtrate discharge pipe. Thus, by compared with the conventional centrifugal machine, the centrifugal filtering device of the present invention demonstrates superior features over the dead-end filtration (i.e. the filter-cake filtration) and the cross-flow filtration, since the centrifugal filtering device of the present invention is to provide opposing flow directions to the particles and the filtrate so that a higher filtration rate and a slowdown in fouling the filter can be obtained.

In addition, since the rotary filter of the present invention is installed in the centrifugal drum, so when the centrifugal drum or the rotary filter rotates to generate a vortex, the heavier particles with larger granular sizes would be affected by the centrifugal force and thus be moved toward the inner wall of the centrifugal drum, i.e. in a direction not to foul the surface of the rotary filter. Thereupon, the source fluid can be continuously filtered by the rotary filter for extended service hours without frequently stops for cleaning or replacing the filter cartridge of the rotary filter, and also a maximum filtration rate can be maintained; such that the centrifugal filtering device provided by the present invention can be applicable to both the batch and the continuous operations.

Further, since the centrifugal filtering device of the present invention includes a fluid-collecting tank, thus the fluid still containing plenty of particles but exhausted from the fluid outlets can be collected. Moreover, upper fluid-collecting tanks can be also introduced to carry out a sorted separating filtrate.

In addition, while the conventional centrifugal machine performs the filtration, the particles are easier to pile on the filter so as to result in a drop in filtration rate. However, while the centrifugal filtering device of the present invention performs the centrifugal filtration, ideally (if sufficient centrifugal forcing can be provided), all the particles would be driven to the drum body of the centrifugal drum. Even in the case that the centrifugal forcing is insufficient so that a few particles can still pile on the filter body, compensation means can be utilized, as described above, to slow the drop in filtration rate. These compensation means provided by the present invention include the flow-rate detector mounted at the filtrate outlet of the filtrate discharge pipe to determine a decrease in the feeding flux of the source fluid according to the reduction in the filtrate flow amount. By having the curve C2 of FIG. 9 as an example, the filtrate flux is about 200 LPH at the 2000-second operation point, and is about 170 LPH at the 3000-second operation point (reduced by 30 LPH). Thus, in the present invention, the feeding amount at the 3000-second operation point can be lowered by 30 LPH, accordingly.

In practical applications, the centrifugal filtering device of the present invention can be applied to cut and polish the wafer. Since the major element of the wafer is the S1, so the SiC can be used to produce the polishing abrasive grains, and the PEG or the like organic solution can be applied. In order to reduce the cost, the organic solution is usually recycled. Then, when the recycled PEG containing SiC and Si is fed into the centrifugal filtering device of the present invention as the source fluid, the heaviest SiC particles would be driven to hit the inner wall of the drum body by the centrifugal force and thereafter be exhausted from the fluid outlet, the sub-heavy Si particles would be exhausted from the overflow outlets, and the lightest PEG would pass the filter cartridge for filtering and then reach the filtrate-collecting space as a clear filtrate. Thereupon, the organic solution can be effectively recycled, and thereby the cost can be significantly reduced. In addition, in order to avoid the accumulation of the SiC particles on the inner wall of the drum body, a spiral blade can be further included at the rotary filter so as to scrape off and expel the SiC particles coated on the surface of the inner wall of the drum body.

Though the aforesaid description is elucidated by having the liquid substance as the typical example, yet, to the skill person in the art, he/she shall be easy to apply the teaching of the present invention to perform relevant filtration upon a gas substance.

While the present invention has been particularly shown and described with reference to a preferred embodiment, it will be understood by those skilled in the art that various changes in form and detail may be without departing from the spirit and scope of the present invention.

What is claimed is:

1. A centrifugal filtering device, applied to centrifugally filter a source fluid including a plurality of particles, comprising:
   a centrifugal drum, including a receiving space thereinside for accommodating the source fluid; and
   a rotary filter, rotatably mounted in the receiving space, further including:
      a filter body, including a filter cartridge for forming a filtrate-collecting space; and
      a filtrate discharge pipe, connected with the filter body, being communicative in space with the filtrate-collecting space;
   wherein, by rotating at least one of the centrifugal drum and the rotary filter, the source fluid is driven to generate a vortex by a centrifugal force;
   wherein, in a circumstance of providing a non-decreasing feeding amount of the source fluid, the centrifugal force drives the source fluid to form a heavy-phase fluid hitting the centrifugal drum and a light-phase fluid approaching the filter cartridge;
   wherein a weight distribution of the particles of the source fluid is in a decreasing manner from the heavy-phase fluid to the light-phase fluid; and
   wherein the light-phase fluid passes the filter cartridge and then reaches the filtrate-collecting space as a filtrate, and the filtrate is exhausted via the filtrate discharge pipe of the centrifugal filtering device;
   wherein an outer diameter of the filter cartridge is D1, an inner diameter of the centrifugal drum is D2, a height of the filter cartridge is H, and (D2−D1)/H>1.0.

2. The centrifugal filtering device of claim 1, wherein the filter body further includes a base cover and a top cover, the base cover and the top cover being fixedly located respectively at a bottom and a top of the filter cartridge so as thereby to enclose the filtrate-collecting space, the filtrate discharge pipe being connected to the base cover.

3. The centrifugal filtering device of claim 1, wherein the rotary filter further includes a source fluid-feeding pipe connected with the filter body and rotationally penetrating the centrifugal drum, the source fluid-feeding pipe having at least one material-feeding opening communicative in space with the receiving space so as to allow the source fluid to enter the receiving space via the source fluid-feeding pipe.

4. The centrifugal filtering device of claim 1, wherein the filtrate discharge pipe rotationally penetrates the centrifugal drum.

5. The centrifugal filtering device of claim 1, wherein the centrifugal drum includes a lower casing, a drum body and an upper casing, the lower casing having at least one fluid outlet communicative in space with the receiving space, the heavy-phase fluid being exhausted out of the receiving space via the fluid outlet, the lower casing and the upper casing being respectively connected to opposing ends of the drum body so as to define the receiving space thereinside.

6. The centrifugal filtering device of claim 1, wherein the centrifugal drum includes a lower casing, a drum body and an upper casing, the drum body is fixedly located between the lower casing and the upper casing, and the drum body is set to have filtration functions.

7. The centrifugal filtering device of claim 1, further including a fluid-collecting tank, the centrifugal drum being rotatably disposed in the fluid-collecting tank and further having at least one fluid outlet communicative in space with the receiving space, the fluid-collecting tank being to collect the heavy-phase fluid exhausted from the fluid outlet.

8. The centrifugal filtering device of claim 1, wherein the centrifugal drum includes a filtering drum body for filtering the heavy-phase fluid.

9. The centrifugal filtering device of claim 1, wherein the rotary filter further includes a spiral blade located at the filter cartridge.

10. The centrifugal filtering device of claim 1, wherein the filter body further includes a plurality of discs connected with the filter cartridge.

11. The centrifugal filtering device of claim 3, wherein a distance from a rotating axis to the material-feeding opening is D4, a radius of the centrifugal drum is D3, and D4/D3>0.5.

12. The centrifugal filtering device of claim 1, wherein a radial speed of the source fluid in the receiving space is greater than an axial speed thereof, and a centrifugal speed of the source fluid in the receiving space is greater than the radial speed thereof.

13. A method for operating the centrifugal filtering device of claim 1, comprising the steps of:
(a) constructing a delivery piping so as to connect a source fluid-storage container having the source fluid to the receiving space of the centrifugal drum;
(b) applying a pump to convey the source fluid stored in the source fluid-storage container to continuously fill the receiving space; and
(c) rotating at least one of the centrifugal drum and the rotary filter, the source fluid is driven to generate a vortex by a centrifugal force; further, in a circumstance of providing a non-decreasing feeding amount of the source fluid, the centrifugal force driving the source fluid to form a heavy-phase fluid hitting the centrifugal drum and a light-phase fluid approaching the filter cartridge where a weight distribution of the particles of the source fluid is in a decreasing manner from the heavy-phase fluid to the light-phase fluid; and, then the light-phase fluid passing the filter cartridge and reaching the filtrate-collecting space as a filtrate while the filtrate is exhausted via the filtrate discharge pipe of the centrifugal filtering device.

* * * * *